United States Patent [19]

Edwards et al.

[11] 4,175,400
[45] Nov. 27, 1979

[54] AIR CONDITIONING SYSTEM EMPLOYING NON-CONDENSING GAS WITH ACCUMULATOR FOR PRESSURIZATION AND STORAGE OF GAS

[75] Inventors: Thomas C. Edwards, Cocoa Beach, Fla.; Amir L. Ecker, Dallas, Tex.

[73] Assignee: The Rovac Corporation, Rockledge, Fla.

[21] Appl. No.: 958,650

[22] Filed: Nov. 8, 1978

Related U.S. Application Data

[63] Continuation-in-part of Ser. No. 769,958, Feb. 18, 1977.

[51] Int. Cl.² .............................................. F25B 9/00
[52] U.S. Cl. ....................................... 62/174; 62/324; 62/402
[58] Field of Search .............. 62/149, 172, 174, 324 E, 62/402; 137/625.69

[56] References Cited

U.S. PATENT DOCUMENTS

| | | | |
|---|---|---|---|
| 2,094,926 | 10/1937 | Nutter et al. | 137/625.69 |
| 2,715,317 | 8/1955 | Rhodes | 62/149 |
| 3,237,422 | 3/1966 | Pugh | 62/174 X |

Primary Examiner—William E. Wayner
Attorney, Agent, or Firm—Leydig, Voit, Osann, Mayer & Holt, Ltd.

[57] ABSTRACT

An air conditioning system for an enclosed space employing a unitary compressor and expander of the positive displacement type, each having an inlet port and an outlet port, with a primary heat exchanger connected between the compressor outlet port and the expander inlet port and a secondary heat exchanger connected between the expander outlet port and the compressor inlet port to complete a closed loop having a charge of gas, the gas being non-condensing at the temperatures and pressures encountered in the unit. An accumulator holds an auxiliary charge of the pressurized gas at a pressure which is lower than the pressure existing in the primary heat exchanger and higher than the pressure existing in the secondary heat exchanger. A first intermittently operated valve couples the accumulator to the secondary heat exchanger for injection of auxiliary gas into the closed loop to raise the pressure in the secondary heat exchanger substantially above the atmospheric level to increase the heat rate of the system. A second intermittently operated valve couples the accumulator to the primary heat exchanger so that air is bled from the primary heat exchanger to decrease the heat rate of the system. The valves have a common operator arranged to operate the valves alternatively. It is one of the distinctive characteristics of the present invention that the loop is free of any intentional restriction in the form of a capillary or the like, or any change of phase, so that the system may be switched between high and low heat rates without risk of the "slugging" or "starvation" encountered in conventional air conditioning systems.

11 Claims, 11 Drawing Figures

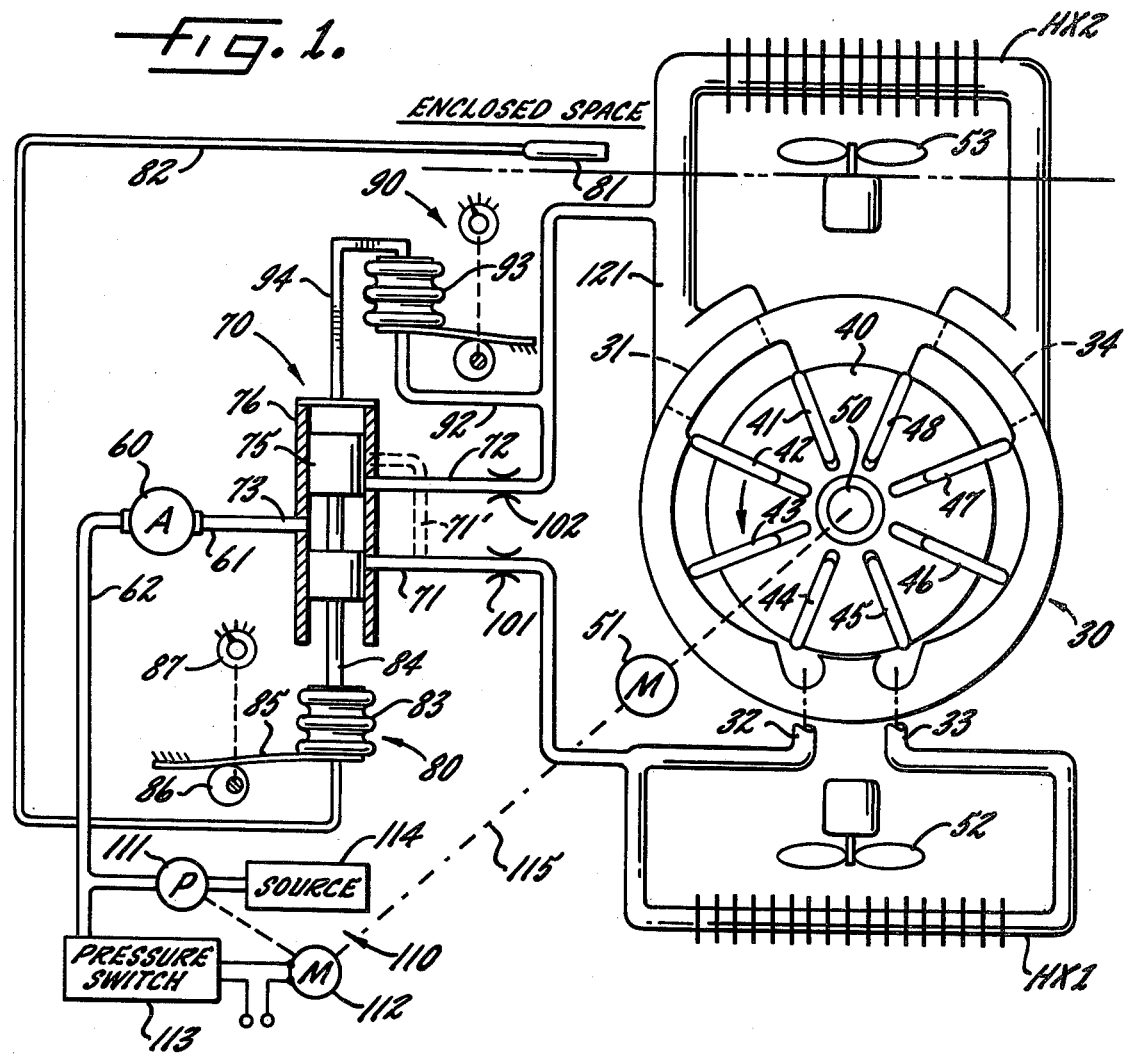
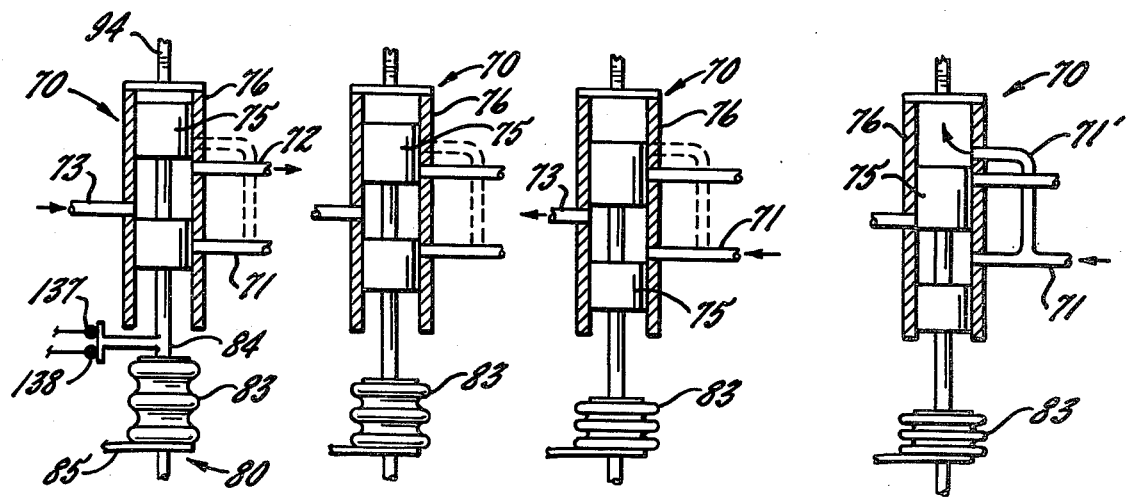

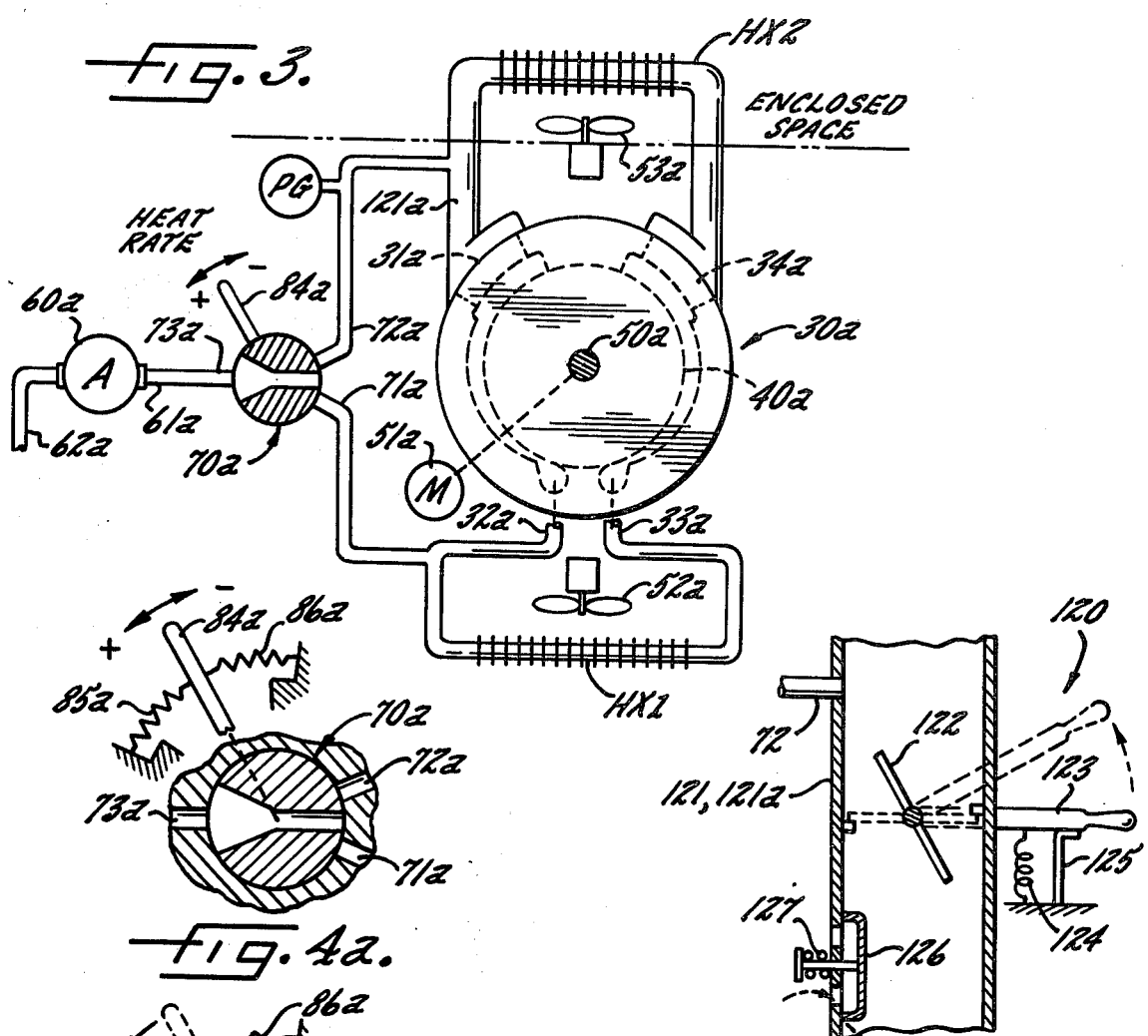
Fig. 3.
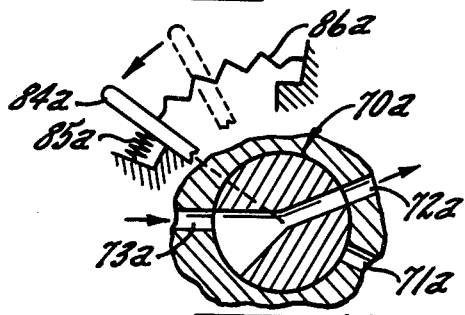
Fig. 4a.
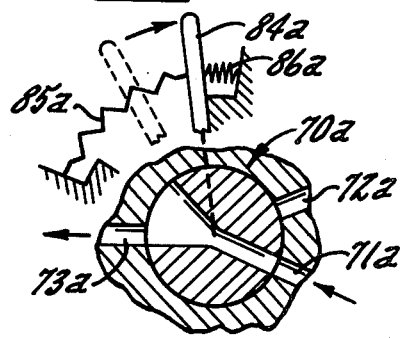
Fig. 4b.
Fig. 4c.
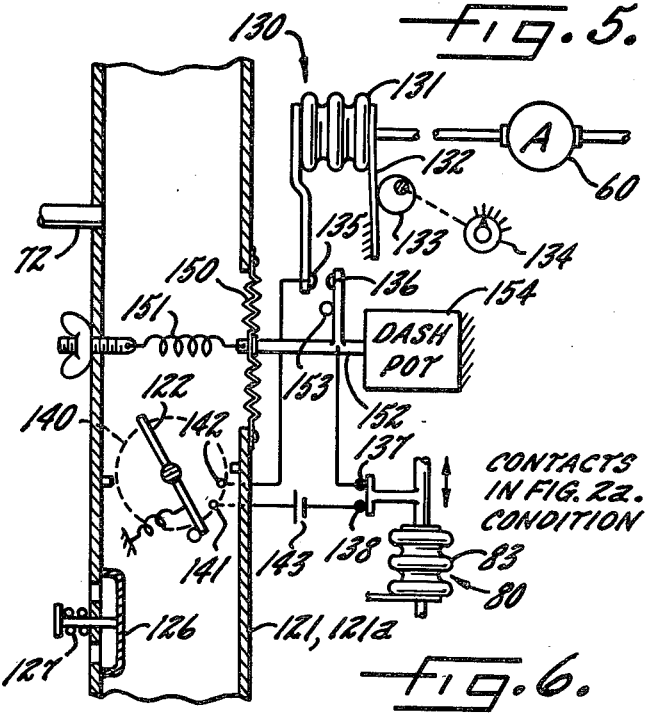
Fig. 5.
Fig. 6.

AIR CONDITIONING SYSTEM EMPLOYING NON-CONDENSING GAS WITH ACCUMULATOR FOR PRESSURIZATION AND STORAGE OF GAS

The present application is a continuation-in-part of our application Ser. No. 769,958 filed Feb. 18, 1977.

In our earlier application Ser. No. 858,241 filed Dec. 8, 1977, there is disclosed an air conditioning system having a unitary compressor and expander of the positive displacement type coupled together through primary and secondary heat exchangers to form a closed loop having a charge of air. An auxiliary pump is provided for progressively injecting ambient air under pressure into the loop to increase the heat rate of the system and for progressively bleeding air from the loop back to the ambient air to reduce the heat rate of the system, for example, under the control of a thermostat. Such a system requires the pump to be operated almost constantly in the face of constant changes in demand and the system is limited to use of ambient air as the refrigerating medium.

In our application Ser. No. 769,958 filed Feb. 18, 1977, of which the present application constitutes a continuation-in-part, there is disclosed a similar compressor-expander with attached primary and secondary heat exchangers forming a closed loop charged with air and with provision for momentarily blocking the outlet of the secondary heat exchanger and for aspiration of additional ambient air into the system at the compressor inlet. To lower the heat rate passive bleeding means are employed. The blocking and aspiration imposes peaks of loading upon the motor which drives the compressor-expander, requiring use of a motor of adequate capacity and a compressor-expander unit which is durably constructed. Moreover, the blocking and aspiration technique is limited as a practical matter to the use of ambient air as the refrigerant.

Rhodes U.S. Pat. No. 2,715,317 discloses a conventional freon refrigeration system working on the reverse Rankine cycle, a system which requires change of state of the refrigerant, from liquid to gas, in order to secure the refrigerating effect. The Rhodes system requires use of the restriction in the form of a capillary tube to limit, and meter, liquid refrigerant being fed to the evaporator. Rhodes attempted to secure variation in heat rate by providing a receiver 40 for containing liquified refrigerant and which feeds the refrigerant into the system through a second restricted capillary. The use of a capillary, which applicants specifically avoid, and which would make applicants' system inoperative if one were used, is accompanied by a number of serious disadvantages. In the first place, a capillary is inherently non-adjustable so that the resulting system is limited to an extremely narrow range of heat rate. Any attempt to abruptly impose a higher heat rate runs serious risk of "slugging" with possible destruction of the compressor, while any attempt to substantially reduce the heat rate runs risk of high super-heat of the vapor entering the compressor resulting in high operating temperatures, a condition generally referred to as "starvation."

Even if these hazards are overlooked, the Rhodes system is inherently limited to variations in heat rate which are limited, at the high end, to the nominal capacity of the system. In other words Rhodes, while capable of modulating the heat rate downwardly through a relatively narrow range is powerless to modulate the heat rate upwardly from the nominal capacity of the system, whereas it is one of the features of the applicants' device that the nominal capacity of the system may be modulated upwardly by a factor of 2, 3 and possibly more.

Also inherent in the Rhodes system is the necessity for keeping the receiver at a predetermined temperature for the system to work at all, which is to be contrasted with the applicants' system in which the accumulator efficiently performs its function at any temperature.

Moreover, Rhodes provides but a single valve 34, of the on/off type, for bleeding of liquid from the system with no control whatsoever being exercised to correctively vary the liquid which is injected back into the system, with a resulting impossibility of responding to sudden demands, whereas applicants provide separate alternatively operated valves for controlling gas, not liquid, and which are respectively capable of instant supercharge of the system for immediate achievement of maximum heat rate or prompt dumping of gas from the system to accommodate an abrupt drop to a low value of thermal demand. Moreover, Rhodes includes no means for replenishment of his receiver for compensation of refrigerant loss through leakage, much less any automatic means to secure such replenishment.

It is an object of the present invention to provide a simplified air conditioning system capable of operation over a wide range of heat rate and in the face of frequent and abrupt changes in thermal demand. It is a more specific object of the present invention to provide an air conditioning system employing a non-condensing gas and capable of variation from low to high heat rates, or the reverse, thereby to keep a more constant temperature in the controlled space without the risk of either "slugging" or "starvation" encountered in more conventional systems in the face of a sudden change in demand.

It is another specific object of the invention to provide, in an air conditioner employing a compressor-expander in a closed loop circuit, a pressurized accumulator, filled with gas, not liquid, with a pair of alternatively operated valves capable of "dumping" of gas into the refrigeration loop in response to sudden increase in thermal demand as well as the "dumping" of gas from the loop back into the accumulator upon a sudden and drastic drop in demand without any risk whatsoever of "slugging" or "starvation" and without imposing high peak loads upon the driving motor; instead, any change in load upon the motor is in the form of a step change, enabling use of a motor of relatively low maximum capacity. It is a related object to provide a system having an accumulator which performs its function efficiently entirely independent of the temperature of the accumulator or the temperature of the environment in which it is placed. This makes the system particularly suited for automotive purposes where the temperature under the hood may vary over extraordinarily wide limits.

It is another object, related to the above, to provide an air conditioning system in which convenient means are provided for periodically replenishing the system to make up for accumulated leakage and particularly to achieve carefree replenishment on an automatic basis. Where the system is to be replenished from a non-pressurized source, a replenishment pump of extremely low capacity suffices.

It is an object of the invention in one of its aspects to provide an accumulator with an associated set of injecting and bleed valves which not only permits immediate corrective response to a temperature change within the controlled space by change in heat rate but which permits precise control of the temperature without overshoot, the latter being accomplished by feedback applied negatively to the valves.

It is still another object of the invention to provide a closed loop system which is well suited for free circulation of a pressurized, non-condensing gas other than air about an enclosed refrigeration loop and with means for constantly varying the amount of the gas in the loop in accordance with changes in the thermal demand while isolating the gas from the ambient atmosphere. It is, nonetheless, an object to provide a system of the above type which works exceedingly well with air as the refrigerating medium.

It is yet another object of the invention, in one of its aspects, to provide for replenishment of the system by periodic injection of ambient air directly into the loop by blocking and aspiration techniques.

It is, in conclusion, a specific object of the present invention to provide a closed loop air conditioning system employing a non-condensing gas with a three-way valve for corrective feeding of gas back and forth between the loop and a pressurized accumulator resulting in a system which has a wide range of heat rate capability but which is, nonetheless, simple and economical, capable of being economically constructed and efficiently operated at a cost which is potentially only a fraction of the cost of a conventional system having the same maximum capability. In this connection it is an object to provide an air conditioner for all-season usage which, being sealed, is capable of being permanently charged with totally gas-borne lubricant for trouble-free operation over long periods of time.

Other objects and advantages of the invention will become apparent upon reading the attached detailed description and upon reference to the drawings in which:

FIG. 1 shows an air conditioning system constructed in accordance with the present invention employing an accumulator and three-way valve for alternatively charging and bleeding the system in response to changes in thermal demand, with pressure follow-up and with means for automatic replenishment of the accumulator;

FIGS. 2a-2c are a set of stop motion views showing the three-way control valve under conditions where the temperature in the controlled space is respectively (a) too high, (b) at equilibrium, and (c) too low;

FIG. 2d shows use of an optional vent in the valve which may be employed where air is used as the refrigerant;

FIG. 3 shows a simplified form of the system of FIG. 1 intended for use in low cost installations and which includes a manually operated valve for administering a shot of gas in either the injection or bleed directions thereby to provide a step change in the thermal rate;

FIGS. 4a-4c are stop motion views, with FIGS. 4b and 4c showing the valve in its injection and bleed positions respectively; and FIGS. 5 and 6 show respective manual and automatic means for injecting air directly into the loop from the ambient atmosphere and thereby replenishing the accumulator upon a drop in accumulator pressure resulting from system leakage.

While the invention has been described in connection with certain preferred embodiments, it will be understood that we do not intend to be limited by the particular embodiments shown but we intend, on the contrary, to cover the various alternative and equivalent constructions included within the spirit and scope of the appended claims.

Turning now to FIG. 1 there is shown, in simplified schematic form, a compressor-expander air conditioning system. The system includes a unitary compressor-expander 30 which may be constructed as set forth in prior U.S. Pat. Nos. 3,904,327 and 3,956,904. It will suffice to say that the compressor-expander includes a vaned rotor rotating in an elliptical chamber, the chamber defining a compressor side having inlet and outlet ports 31, 32 and an expander side having inlet and outlet ports 33, 34. The rotor, indicated at 40, has a set of vanes 41–48 and is driven by shaft 50 connected to a drive motor 51.

Connected between the compressor outlet port 32 and the expander inlet port 33 is a primary heat exchanger HX1 in which heat is liberated. Similarly, connected between the expander outlet port 34 and the compressor inlet port 31 is a secondary heat exchanger HX2 in which heat is absorbed. Thus the system may be employed either as a refrigerator or as a heater (heat pump) depending upon whether the secondary or primary heat exchanger is thermally coupled to the enclosed space. In the discussion which follows it will be assumed that the system is being employed for refrigeration effect, with the heat exchanger HX2 in the enclosed space and the heat exchanger HX1 located in the ambient atmosphere. Both heat exchangers may be provided with air circulating fans 52, 53 as is well known in the art.

In operation, with the compressor-expander 30 and the heat exchangers connected in a closed loop with a contained charge of non-condensing gas, such as air, and with the rotor 40 rotated in a counterclockwise direction, gas is drawn into the compressor inlet port 31 into the space defined by adjacent vanes, for example, the vanes 41, 42. The gas, while it is held captive, is positively compressed and exits in a compressed and heated state from the compressor outlet port 32 into the primary heat exchanger HX1 where the heat is carried away by air currents generated by fan 52. The gas in the heat exchanger, still compressed, but at a low temperature only slightly greater than ambient, is discharged into the inlet port 33 of the expander and positively expanded between adjacent vanes for exiting at a reduced, original, pressure, but now in a cold state, into the secondary heat exchanger where heat is subtracted from the enclosed space, with assistance from the circulating fan 53.

The gas, it may be noted, circulates freely in the loop, being impelled forwardly on both the compressor and expander sides, free of any intentional phase-changing restriction in the form of a capillary or the like. This is true at all pressure levels, even when the pressure in the secondary heat exchanger is several times atmospheric.

In accordance with the present invention, an accumulator is provided holding auxiliary charge of pressurized gas, the accumulator having a pressure which lies between the pressures in the respective heat exchangers, the accumulator being coupled to the heat exchangers by alternatively operated valves, preferably in the form of a three-way valve operated by a control element. Thus, referring to FIG. 1, an accumulator 60 is provided in the form of a small auxiliary tank of compressed gas having an operating line 61 and a replenishing line 62 to which later reference will be made. The line 61 communicates with a three-way valve 70 having a high pressure connection 71, a low pressure connection 72, and a common connection 73. The valve conveniently takes the form of a spool valve having a piston 75 slidable within an outer shell 76. The high pressure connection 71 communicates with the primary heat exchanger HX1 at the compressor outlet port 32 while the low pressure connection communicates with the secondary heat exchanger HX2 at the compressor inlet port 31.

For the purpose of controllably, and correctively, operating the valve spool, a thermostat 80 is used having a responsive member in the form of a remote bulb 81 which is connected by a capillary 82 to a bellows 83 having a plunger 84, the bellows being mounted upon an arm 85 positioned by a cam 86 having a settable control knob 87.

For providing a pressure feedback signal thereby to inhibit overreaction of the system, that is, overshoot of a temperature beyond the control point, a pressure follow-up assembly 90 is used. The follow-up assembly includes a connection 92 coupling the secondary heat exchanger to a bellows 93 which controls a plunger 94 connected to the valve sleeve 76 of the three-way valve 70.

To understand the operation of the system, it will first be assumed that, due to sudden demand, the temperature in the enclosed space has risen beyond the control point resulting in expansion of the bellows 83, as shown in FIG. 2a accompanied by upward movement of the valve spool so that communication is established between valve connections 72, 73. This results in flow of gas from the accumulator 60 into the secondary heat exchanger, thereby increasing the pressure in the loop and the heat rate of the system, that is, the rate at which heat is absorbed by secondary heat exchanger HX2. However, to avoid excessive build-up of loop pressure, and to compensate for delay in response of the thermostat, resulting in overshoot of the temperature, the pressure in the system, acting upon bellows 93, results in raising of the valve sleeve 76. The result is to produce "proportional action" wherein a small temperature increase above the control point brings about a relatively small corrective increase in pressure. In contrast, where there is a more drastic increase in temperature, resulting in a high degree of expansion of the bellows 83, a correspondingly large pressure build-up is permitted to occur in the secondary heat exchanger thereby maximizing the corrective action. In either event the effect is to increase the pressure in the loop to an amount which is in equilibrium to the increased demand upon the system, following which the three-way valve is restored to its neutral or cut-off position as illustrated in FIG. 2b.

Upon a reduction in the demand of the enclosed space, the opposite occurs as illustrated in FIG. 2c. The temperature in the enclosed space becomes too cold causing the bellows 83 to contract so that there is communication between valve connections 71, 73 resulting in the flow of gas from the primary heat exchanger HX1 back into the accumulator 60. Here again the action of the follow-up device 90 is to insure that the resulting decrease in pressure takes place at an orderly rate, proportioned to the drop in temperature, to prevent overshoot. With the pressure in the loop, and hence the heat rate of the system reduced, the rate of heat extraction from the enclosed space is correspondingly reduced, permitting the temperature in the space to rise to the control point thereby restoring the three-way valve to the neutral or cut-off position illustrated in FIG. 2b, with the system remaining in equilibrium until a further change in demand occurs in the enclosed space.

In accordance with one of the more detailed aspects of the invention, where air is used as the refrigerant, the valve may include an auxiliary venting connection 71' which serves in the event of an extraordinarily drastic reduction in thermal demand to vent excess gas, e.g., air, to the atmosphere. Thus, as shown in FIG. 2d, extraordinary contraction of the bellows 83 serves to shut off the connection 73 leading to the accumulator and to open the venting connection 71'. Such venting connection will, however, be understood to be sealed by the spool in the face of normal variations in thermal loading.

Where the response of the thermostat in the enclosed space is known to be slow, overshoot of the temperature can be additionally avoided by employing restricted orifices 101, 102 in lines 71, 72, respectively. Or, if desired in a more rapidly responding system as, for example, where the thermostate is in the direct path of movement of the air passing through the secondary heat exchanger, the orifices 101, 102 may take the place of the follow-up assembly 90 enabling the more simplified type of valve 70 to be used in the interest of economy.

In accordance with one of the aspects of the invention, means are provided for sensing the need for replenishment of the accumulator 60 which may eventually occur due to slight leakage in the system. The replenishment assembly, indicated at 110, includes a low capacity pump 111 driven by an auxiliary motor 112 under the control of a pressure switch 113 responsive to accumulator pressure. The inlet of the pump 111 is coupled to a source 114 which, in the event that air is used as the refrigerant, may be the ambient atmosphere. If it is desired to dispense with the replenishing motor 112, power may be derived directly from the main drive motor 51 via a shaft 115, the motor 112 then being replaced by a simple electrically energized rotary clutch. Further, where the auxiliary source 114 is at high pressure the pump 111 may be substituted by a simple solenoid valve under the direct control of the pressure switch 113, a matter well within the skill of the art.

It will be seen that the air conditioning system disclosed in FIG. 1 amply fulfills the objects of the invention. The system is inherently capable of promptly, and without risk, accommodating extremely wide changes in thermal demand, either in the form of a sudden increase or a sudden decrease. Upon large increase in demand air is "dumped" from the accumulator into the secondary heat exchanger thereby correctively pressurizing the loop. Upon any drastic reduction in thermal demand the opposite occurs, air is "dumped" from the primary heat exchanger back into the accumulator. In both cases the capacity of the system is brought into equilibrium with the load and the temperature is restored to the set point without objectionable overshoot. Between the extremes, the pressure in the secondary heat exchanger is varied from nominal atmospheric value to several times the atmospheric level thereby increasing the nominal capacity of the system by the same factor. Under conditions of extremely low demand the pressure in the secondary heat exchanger may even be varied from a nominal atmospheric level to an effective vacuum.

One reason for the rapidity of response of the present system is the fact that the loop is free of any intentional restriction in the form of a capillary or the like and to the fact that the size of the accumulator may be tailored to the level of response which is desired. While the illustrated system is simple and inherently economical, it is capable of greatly outperforming a much more expensive freon system having the same maximum thermal capacity.

The system of FIG. 1 may be further simplified, while retaining certain important aspects of the present invention, as shown in FIG. 3 in which corresponding reference numerals have been employed with the addition of subscript a to indicate elements having a corresponding function. The system of FIG. 3 would, for example, be usable with advantage as an economical automotive air conditioner manually settable to a heat rate which produces a comfortable temperature under a given set of conditions. In this version, an accumulator 60a having an active line 61a and a replenishing connection 62a is connected to a three-way valve 70a having ports, or connections, 71a, 72a, 73a, respectively. Coupled to the movable element of the three-way valve, in this case its rotor, is a manual actuator 84a which, as shown in FIG. 4a, is normally held in a centered off position between springs 85a, 86a which are in opposition to one another. Momentary rocking of the control element 84a in the positive direction, followed by immediate release to center position, causes a "shot" of gas to be transmitted from the accumulator to the secondary heat exchanger thereby raising the pressure in the system to correspond to a higher heat rate. Conversely, moving the control member momentarily in the negative direction followed by prompt release causes a "shot" of gas to be bled from the primary heat exchanger back into the accumulator. The process may be repeated, transferring gas in relatively small increments or decrements. After each release of the control member the system continues to operate at the same heat rate until there is an intentional change. If desired a pressure gage PG may be interposed in the system, here shown as measuring the pressure in the heat exchange HX2, as a guide in the actuation of the control member. If desired the pressure gage may be approximately calibrated in terms of ambient temperature so that when the pointer is set at the ambient the heat rate will be such as to produce a comfortable temperature in the enclosed space.

Where the leakage from the system is small, occasional replenishment of the accumulator through its connection 82a will suffice. Conveniently, where air is used as the refrigerant, the accumulator may be replenished through a conventional air valve stem from any filling station air line.

Where air is used as the refrigerant, the system may be alternatively replenished by using a manual aspirating assembly 120 which may be inserted in the outgoing leg of the secondary heat exchanger HX2, in position 121 or 121a in the embodiments of FIGS. 1 and 3, respectively. As shown in FIG. 5, the blocking valve indicated at 122, which is of the butterfly type, has a manual actuator arm 123 which is urged by a return spring 124 against a fixed stop 125. Downstream from the blocking valve, and adjacent the compressor inlet, is an aspiration valve 126 having a spring 127 for normally keeping the valve seated. When it is desired to aspirate additional air into the system, the blocking valve is rocked into its closed, dot-dash position so that the air in the loop is backed up and compressed. The resulting vacuum drawn at the inlet of the compressor causes unseating of the aspirating valve thereby drawing air into the loop via the compressor. This occurs so promptly that momentary actuation of the blocking valve 122 is all that is required to produce an upward step in pressure in the system. For direct replenishment of the accumulator the valve 70a is rocked into its FIG. 4b position and the blocking valve is held closed until the desired pressure build-up is noted on the pressure gage PG.

Or, if desired, automatic means responsive jointly to the condition of the thermostat and the pressure in the accumulator may be employed to produce automatic replenishment of the accumulator 60 (FIG. 1) using the blocking and aspiration technique. As shown in FIG. 6, means are, first of all, povided for responding to a drop in pressure in the accumulator to a certain triggering level at the same time that the thermostat is calling for a higher heat rate. For responding to accumulator pressure an assembly 130 is used including a bellows 131 mounted upon an arm 132 positioned by a cam 133 under the control of a setting knob 134. The bellows carries a movable contact 135 which cooperates with a fixed but retractable contact 136. Arranged in series with the contacts 135, 136 is a second pair of contacts 137, 138 which are closed when the bellows 83, under the instruction of the thermostatic bulb 81, "calls for cold." The contacts jointly control a rotary solenoid 140 which operates the blocking valve 122 and which has terminals 141, 142. A battery or other source of current 143 completes the circuit.

Thus, when the system is called upon to produce a higher heat rate resulting in closure of the contacts 137, 138, at a time when the pressure in the accumulator is below a desired level, causing closure of contacts 135, 136, a circuit to the rotary solenoid 140 is closed to move the blocking valve 122 into its closed position blocking off escape of air from the secondary heat exchanger and placing the aspirator valve 126 under vacuum so that additional air is aspirated into the loop.

Means are provided for causing the air to be aspirated in short "sips," to reduce the load on the driving motor, rather than in a single large gulp. This is accomplished by circuit re-opening means including a diaphragm 150 which works against the biasing spring 151 and which is coupled, by means of a plunger 152 to the relatively stationary contact 136, the normal position of which is determined by a stop 153. Thus as soon as pressure build-up in the conduit 121 occurs by reason of closure of the blocking valve, the diaphragm 150 immediately moves outwardly, opening the contacts 135, 136 which cause the blocking valve 122 to be reopened and momentarily cutting off any further aspiration of air. Reclosure is inhibited by a dashpot 154 which is so constructed as to permit immediate contact-opening movement of the plunger 152 while delaying its return, the action being likened to a buzzer having a controlled repetition rate. When the total amount of air aspirated into the system reaches the point where the bellows 131 coupled to the accumulator expands to keep the contacts 135, 136 open, replenishment is complete and no further action can occur until the accumulator again signals the need for replenishment. Where the replenishment feature of FIG. 6 is used in the system of FIG. 1 it may be necessary, in the latter figure, to dispense with the follow-up assembly 90 to prevent the bellows 93 from raising the valve sleeve thereby to defeat replenishing communication between lines 72, 73.

While the invention has been described in connection with refrigeration of an enclosed space, the same system is ideally suited for heating the space in wintertime by mounting primary heat exchanger HX1, instead of HX2, in the enclosed space. This may be accomplished by interchanging the heat exchanger connections via suitable transfer valves. In addition, the sense of the valve movement, with respect to the bellows 83, must be reversed, which can readily be accomplished in the present system by reversing the position of the bellows 83 so that it extends downwardly, instead of upwardly, with respect to the supporting arm 85.

The term "pressure in the loop" it will be understood refers to a pressure condition existing in the loop and not, of course, to the existence of a particular pressure around the loop. Also while a rotary solenoid of the "LEDEX" type is preferred, the term "solenoid" as used herein is not limited to any particular form or make of solenoid, rotary or otherwise, but includes any electrically operated means for shifting the blocking valve between its open and closed positions. The term "vane" as used here refers to any means for forming enclosed compartments which are progressively contracted and expanded as the motor is driven. The term "non-condensing gas" refers to a gas such as air which does not condense to liquid form in the face of the pressures and temperatures encountered in the unit. The term "enclosed space" as used herein refers to any region which is being controllably heated or cooled and the term "air conditioning system" refers equally to means for bringing about heating or cooling.

In the various embodiments of the invention discussed above, a bellows has been described and illustrated as a transducing element, with the motion of the bellows being utilized as an output signal representative of the condition, temperature or pressure, which is being responded to. However, it will be understood by one skilled in the art that a bellows has been shown for the sake of simplicity and that the invention is by no means limited to use of a bellows as a transducing element, and it will be understood by one skilled in the art that other types of transducers capable of producing an output signal which varies in accordance with changes in a condition may be utilized.

As stated, the system is ideally suited to "winter-summer" operation and controlled by the simple expedient of switching of the heat exchangers and by reversing the sense of the temperature responsive element. Because of the wide range of heat rate which may be achieved by the present system, both winter and summer conditions can be easily accommodated, with an equilibrium pressure in the secondary heat exchanger of, say, two atmospheres in summer and four to five atmospheres in winter.

Because of the closed and sealed nature of the system, and since the refrigerant is always in the gaseous state, the system is capable of being permanently charged with a largely gas-borne lubricant which circulates in atomized form for efficient lubrication of the vanes. The system thus insures against pollution of the atmosphere by either lubricant or, more importantly, gases of the freon type.

What we claim is:

1. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of a non-condensing gas, the loop being free of any intentional restriction in the form of a capillary or the like, one of the heat exchangers being thermally coupled to the enclosed space, an accumulator holding an auxiliary charge of the pressurized gas, the pressure of the gas in the accumulator being in an operating range lower than the operating pressure existing in the primary heat exchanger and higher than the operating pressure existing in the secondary heat exchanger, first intermittently operated valve means for coupling the accumulator to the secondary heat exchanger so that auxiliary gas is injected into the closed loop thereby to raise the pressure in the secondary heat exchanger above the atmospheric level to increase the heat rate of the system, and second intermittently operated valve means for coupling the accumulator to the primary heat exchanger so that air is bled from the primary heat exchanger to the accumulator thereby to lower the pressure in the loop to decrease the heat rate of the system, a thermostat in the enclosed space and having a responsive member which moves in opposite directions as its temperature in the space respectively rises and falls, the first and second valve means both being coupled to the responsive member for alternative operation as the responsive member moves in its opposite directions thereby correctively varying the heat rate so as to maintain the temperature in the space substantially constant, and auxiliary means for replenishing the accumulator with gas so that the pressure therein remains in the operating range.

2. The combination as claimed in claim 1 including manual operator means coupled to the first and second valve means for alternatively opening the respective valve means upon movement of the control member in opposite directions, each valve means being so constructed as to permit momentary manual opening for transmission of a shot of gas therethrough thereby to achieve a respective increase in the pressure of the secondary heat exchanger and a decrease in the pressure in the primary heat exchanger in relatively small increments and decrements.

3. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of non-condensing gas, the loop being free of any intentional restriction in the form of a capillary or the like, one of the heat exchangers being thermally coupled to the enclosed space, an accumulator holding an auxiliary charge of the pressurized gas, the pressure of the gas in the accumulator being lower than the pressure existing in the primary heat exchanger and higher than the pressure existing in the secondary heat exchanger, a three-way valve having a first port connected to the primary heat exchanger, a second port connected to the secondary heat exchanger and a common port connected to the accumulator, the three-way valve having an operator which normally occupies a central position and which is movable alternatively and momentarily in opposite directions (a) to connect the common port to the first port for intermittent feeding of a shot of gas from the primary heat exchanger to the accumulator to decrease the heat rate of the system and (b) to connect the common port to the second port for intermittent feeding of a shot of gas from the accumulator to the secondary heat exchanger to increase the pressure therein substantially above atmospheric level thereby to increase the heat rate of the system, a thermostat being in the enclosed space and coupled to the operator for moving the operator in its opposite directions in response to variations in temperature.

4. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of non-condensing gas, the loop being free of any intentional restriction in the form of a capillary or the like, one of the heat exchangers being thermally coupled to the enclosed space, a thermostat in the enclosed space, an accumulator holding an auxiliary charge of the pressurized gas, the pressure of the gas in the accumulator being lower than the pressure existing in the primary heat exchanger and higher than the pressure existing in the secondary heat exchanger, a three-way valve having a first port connected to the primary heat exchanger, a second port connected to the secondary heat exchanger and a common port connected to the accumulator, the three-way valve having an operator which normally occupies a central position and which is coupled to the thermostat for movement alternatively in opposite directions (a) to connect the common port to the first port for feeding of gas from the primary heat exchanger to the accumulator to decrease the heat rate of the system and (b) to connect the common port to the second port for feeding of gas from the accumulator to the secondary heat exchanger to increase the heat rate of the system, and follow up control means coupled to the valve operator and responsive to pressure changes in the loop for inhibiting overshoot of pressure as the system responds to a change in temperature at the thermostat.

5. The combination as claimed in claim 4 in which there is an external source of pressurized gas with means actuated incident to depletion of gas in the accumulator for injecting gas from the external source into the system.

6. The combination as claimed in claim 4 in which there is an external source of gas coupled to the accumulator and means including a pump having means for operating the same incident to a drop in pressure in the accumulator for replenishing the accumulator.

7. The combination as claimed in claim 4 in which there is an external source of gas, means for sensing a drop in the pressure of gas in the accumulator to a predetermined level for producing an output signal, and means including a pump and responsive to the output signal for pumping gas from the source into the accumulator.

8. The combination as claimed in claim 4 in which there is an external source of gas, a blocking valve at the outlet of the secondary heat exchanger for blocking the flow of gas around the loop, an injection valve at the inlet port of the compressor and coupled to the external source for injecting gas from the external source into the loop, and means actuated incident to a drop in pressure in the accumulator for momentarily operating the blocking valve followed by opening of the injection valve for aspiration of air into the system.

9. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of a non-condensing gas, the loop being free of any intentional restriction in the form of a capillary or the like, one of the heat exchangers being thermally coupled to the enclosed space, an accumulator holding an auxiliary charge of the pressurized gas, the pressure of the gas in the accumulator being lower than the pressure existing in the primary heat exchanger and higher than the pressure existing in the secondary heat exchanger, first intermittently operated valve means for coupling the accumulator to the secondary heat exchanger so that auxiliary gas is injected into the closed loop thereby to raise the pressure in the secondary heat exchanger above the atmospheric level to increase the heat rate of the system, second intermittently operated valve means for coupling the accumulator to the primary heat exchanger so that air is bled from the primary heat exchanger to the accumulator thereby to lower the pressure in the loop to decrease the heat rate of the system, the first and second valve means being arranged for alternative operation, an external source of gas coupled to the accumulator and means including a pump having means for operating the same incident to a drop in pressure in the accumulator for replenishing the accumulator.

10. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of a non-condensing gas, the loop being free of any intentional restriction in the form of a capillary or the like, one of the heat exchangers being thermally coupled to the enclosed space, an accumulator holding an auxiliary charge of the pressurized gas, the pressure of the gas in the accumulator being lower than the pressure existing in the primary heat exchanger and higher than the pressure existing in the secondary heat exchanger, first intermittently operated valve means for coupling the accumulator to the secondary heat exchanger so that auxiliary gas is injected into the closed loop thereby to raise the pressure in the secondary heat exchanger above the atmospheric level to increase the heat rate of the system, second intermittently operated valve means for coupling the accumulator to the primary heat exchanger so that air is bled from the primary heat exchanger to the accumulator thereby to lower the pressure in the loop to decrease the heat rate of the system, the first and second valve means being arranged for alternative operation, an external source of gas, means for sensing a drop in the pressure of gas in the accumulator to a predetermined level for producing an output signal, and means including a pump and responsive to the output signal for pumping gas from the source into the accumulator.

11. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of a non-condensing gas, the loop being free of any intentional restriction in the form of a capillary or the like, one of the heat exchangers being thermally coupled to the enclosed space, an accumulator holding an auxiliary charge of the pressurized gas, the pressure of the gas in the accumulator being lower than the pressure existing in the primary heat exchanger and higher than the pressure existing in the secondary heat exchanger, first intermittently operated valve means for coupling the accumulator to the secondary heat exchanger so that auxiliary gas is injected into the closed loop thereby to raise the pressure in the secondary heat exchanger above the atmospheric level to increase the heat rate of the system, second intermittently operated valve means for coupling the accumulator to the primary heat exchanger so that air is bled from the primary heat exchanger to the accumulator thereby to lower the pressure in the loop to decrease the heat rate of the system, the first and second valve means being arranged for alternative operation, an external source of gas, a blocking valve at the outlet of the secondary heat exchanger for blocking the flow of gas around the loop, an injection valve at the inlet port of the compressor and coupled to the external source for injecting gas from the external source into the loop, and means actuated incident to a drop in pressure in the accumulator for momentarily operating the blocking valve followed by opening of the injection valve for aspiration of air into the system.

* * * * *